United States Patent [19]
Lin

[11] Patent Number: 5,290,437
[45] Date of Patent: Mar. 1, 1994

[54] AUTO-FLUSHING DRAINAGE FILTER SYSTEM

[76] Inventor: Chiu-Chan Lin, 11, Wen-Te Ln., Yu-Wei Road, Miao-Li City, Miao-Li Hsien, Taiwan

[21] Appl. No.: 79,037
[22] Filed: Jun. 21, 1993
[51] Int. Cl.⁵ .............................................. A01K 63/04
[52] U.S. Cl. .................................. 210/169; 210/197; 210/411; 210/416.2; 119/226; 119/264
[58] Field of Search ............ 210/169, 196, 197, 416.2, 210/411, 412, 435, 446; 119/3, 5

[56] References Cited
U.S. PATENT DOCUMENTS 4,177,758 12/1979 Young, II et al. ............... 119/3
4,414,919 11/1983 Hess ............................... 119/5
4,798,168 1/1989 Vadseth et al. .................. 119/3

*Primary Examiner*—Peter A. Hruskoci
*Assistant Examiner*—Robert James Popovics

[57] ABSTRACT

An auto-flushing drainage filter system including a drum filter fastened to the lowest bottom of a fishpond, cylindrical brushes fastened inside the drum filter to remove debris and impurities from the water passing through, a first water pump to pump water from the fishpond through a clean water recycling pipe via the drum filter for circulation and filtration, a second water pump to pump a sudden rush of water from the fishpond into a drain pipe through the drum filter for carrying debris and impurities away from the drum filter.

1 Claim, 3 Drawing Sheets

FIG. 2A—2A

AUTO-FLUSHING DRAINAGE FILTER SYSTEM

BACKGROUND OF THE INVENTION

The present invention relates to a drainage filter system for a fishpond and more particularly to an auto-flushing drainage filter system fastened to a fishpond at the bottom to automatically circulate the water through a drum filter and also to automatically flush the drum filter at a predetermined frequency.

In farming fishes in fishponds, the fishponds must be regularly cleaned so that the optimum natural conditions for fishes can be maintained. However, it is neither easy nor economic to completely change the water of a fishpond. In order to keep a fishpond clean at less cost, a drain filter is commonly used. If a drain filter is used, the filter materials (such as charcoals, pebbles, sands, palm coirs, etc.,) of the drain filter should be replaced regularly. Forgetting to replace the filter materials will deteriorate the performance of the drain filter and shorten its service life.

SUMMARY OF THE INVENTION

In view of the aforementioned problems, the inventor has addressed the objective of maintaining a clean water for a fishpond by circulating the water through a drum filter, without the necessity of manually cleaning the drum filter and the fishpond. As a result of intensive study and design work, based on many years of professional experience, the inventor has created the present invention.

The invention comprises a drum filter fastened to a fishpond at its lowest point, a first water pump to pump water from the fishpond through the drum filter and a clean water recycling pipe and then into the fishpond again for circulation and filtering, a second water pump to pump a sudden rush of water from the fishpond into a drain pipe through the drum filter for carrying debris and impurities away from the drum filter. A timer may be used to control the operation of the first water pump and the second water pump automatically. Therefore, the present invention achieves various advantages as outlined hereinafter.

A. It automatically circulates the water through the drum filter, and also automatically flushes the drum filter to make it clean.
B. It is not necessary to clean the drum filter manually.
C. It keeps the fishpond in the optimum natural conditions for the fishes.
D. It keeps the fishpond nice and clean.
E. It prevents the quality of the water from being deteriorated.

DETAILED DESCRIPTION OF THE PREFERRED EMBODIMENT

Figure 1:
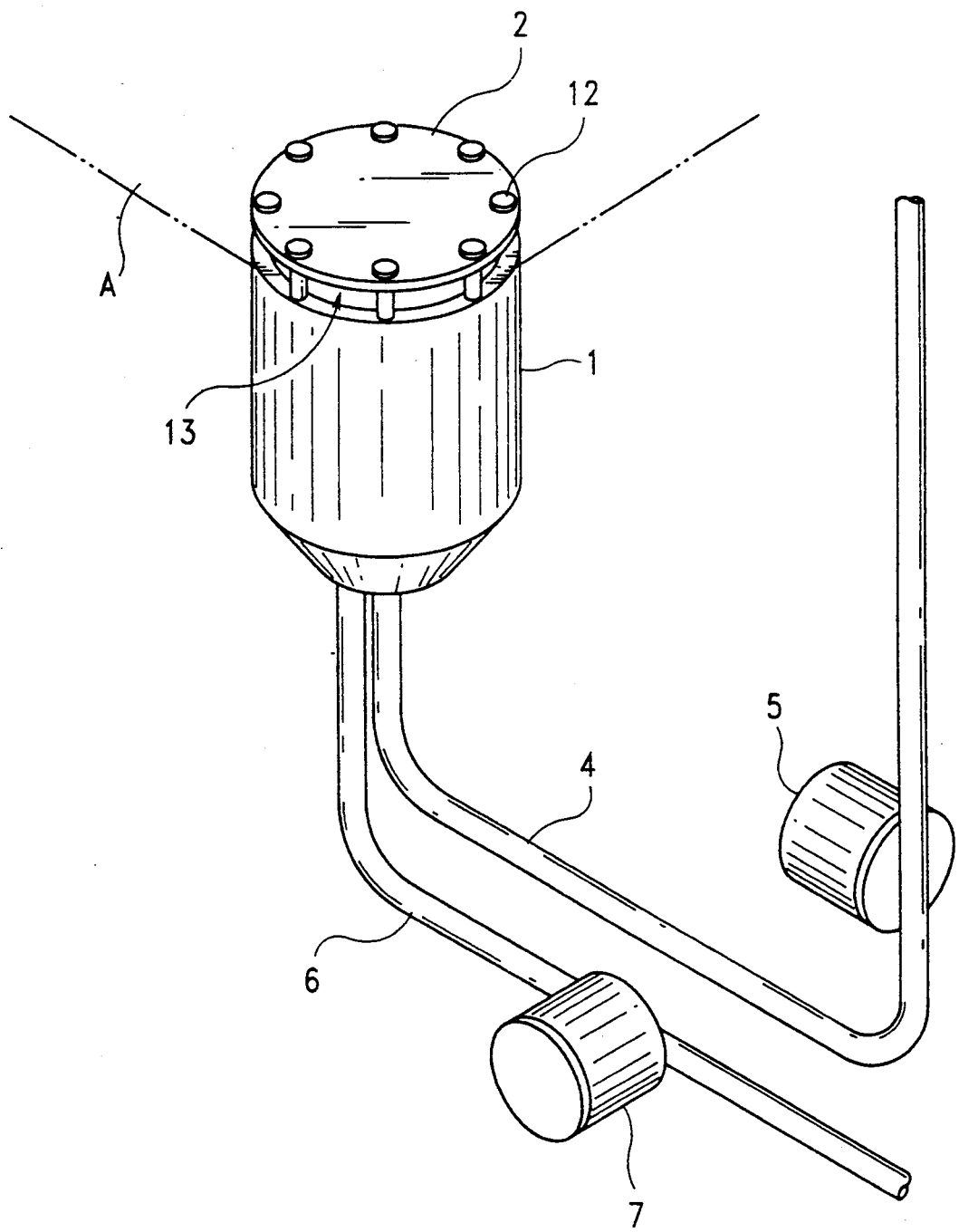
FIG. 1 is a perspective view of a drainage filter system constructed according to the preferred embodiment of the present invention.
Figure 2:
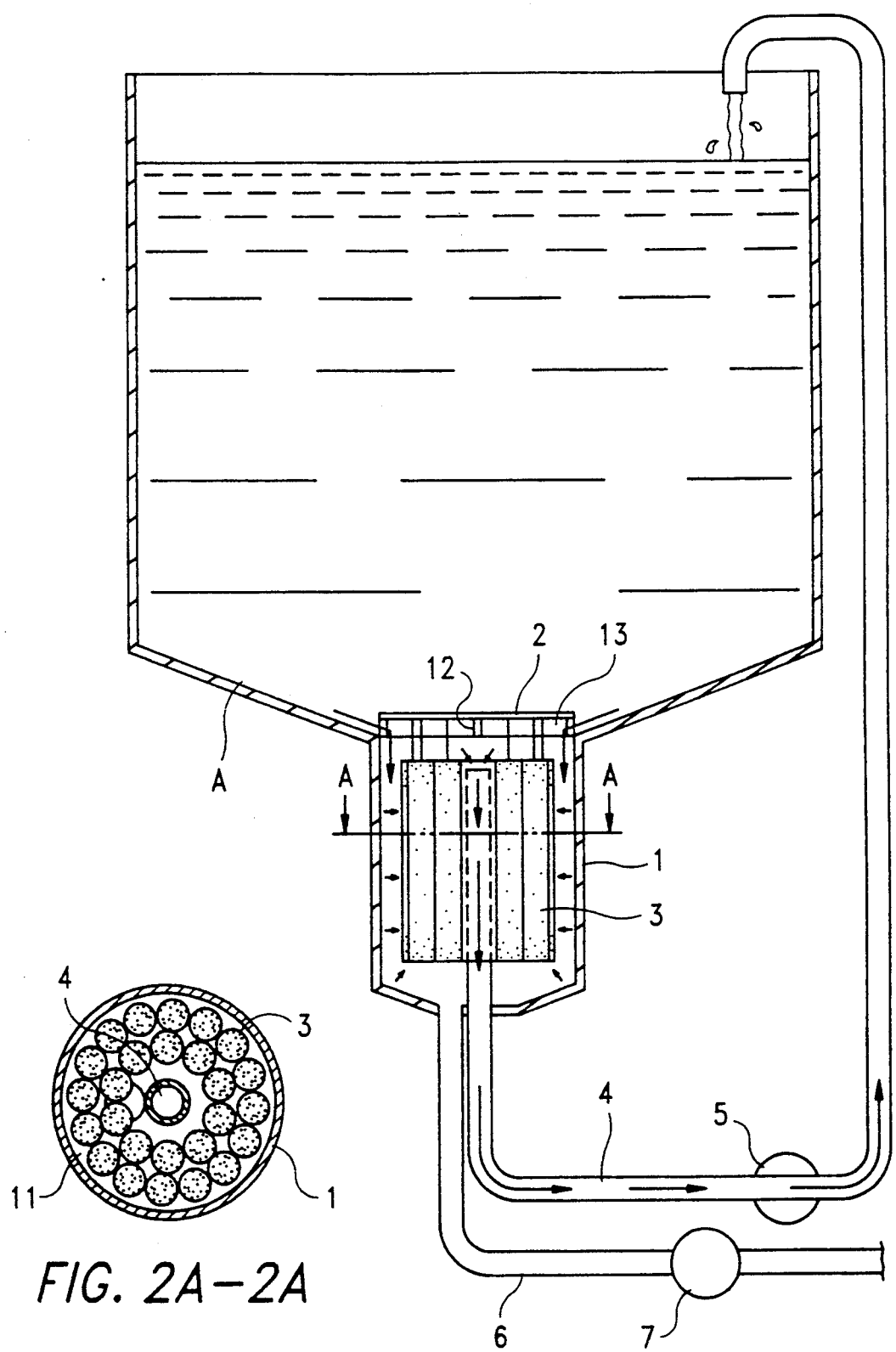
FIG. 2 is an installed view of the drainage filter system of FIG. 1, showing the first water pump operated.

Referring to FIGS. 1 and 2, a drainage filter system in accordance with the present invention is generally comprised of a drum filter 1, a flow guide 2, cylindrical brushes 3, a clean water recycling pipe 4, a first water pump 5, a drain pipe 6, and a second water pump 7. The flow guide 2 is fastened to the drum filter 1 at the top by adjusting tie screws 12, and spaced above the top opening 11 of the drum filter 1 by a gap 13. The pitch of the gap 13 can be adjusted by turning the adjusting tie screws 12 inwards or outwards. By means of changing the pitch of the gap 12, the flow rate of water from the fishpond A into the drum filter 1 is regulated. The cylindrical brushes 3 are suspended from the flow guide 2 and vertically arranged inside the drum filter 1 around one end of the clean water recycling pipe 4. The clean water recycling pipe 4 has one end inserted through a hole (not shown) on the bottom of the drum filter, and an opposite end disposed above the fishpond A. The first water pump 5 is fastened to the clean water recycling pipe 4 at a suitable location, and controlled to pump water from the fishpond A into the clean water recycling pipe 4 for recycling. The second water pump 7 is fastened to the drain pipe 6 at a suitable location. The drain pipe 6 is connected to the drum filter 1 at the bottom for draining the water from the fishpond A.

Figure 3:
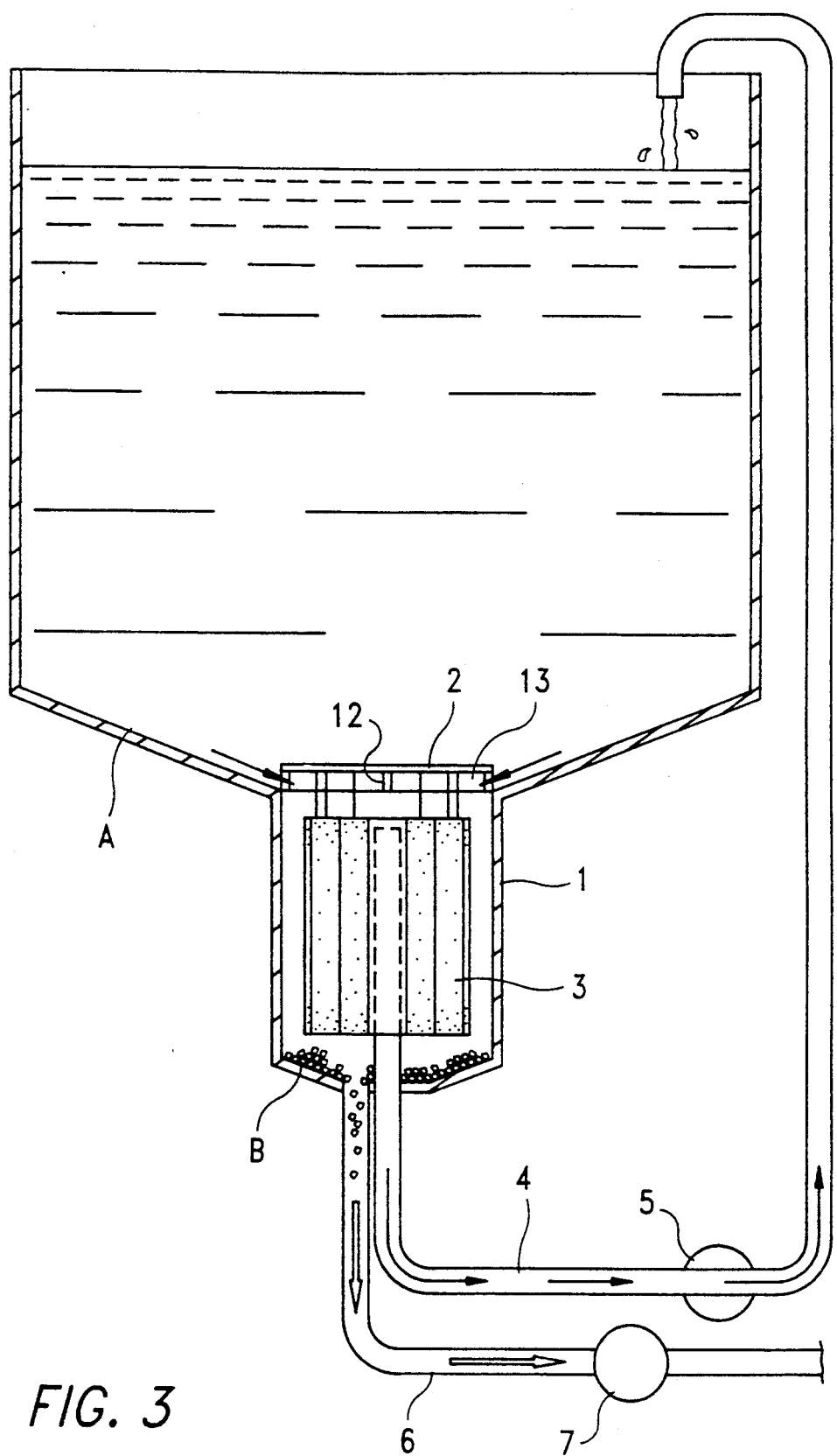
FIG. 3 is similar to FIG. 2 but showing the second water pump operated.

When in use, the drain filter system is installed in the fishpond A at a suitable location. Preferably, the fishpond A has a bottom surface curved inwards so that the drain filter system can be fastened to the fishpond A at the lowest location, and water can be guided from the fishpond A into the drum filter 1. The first water pump 5 is a low horsepower motor. When the first water pump 5 is started, water is drawn from the fishpond A into the drum filter 1 through the gap. As water is being drawn from the fishpond A into the drum filter I debris and impurities (fish feeds, excrete, organisms, etc.) are strained off by the cylindrical brushes 3 and then settled to the bottom. The sediment B of the debris and impurities is then drawn out of the drum filter 1 through the drain pipe 6 by means of the operation of the second water pump 7. The organisms that are adhered to the cylindrical brushes 3 will gather bacteria, which will decompose nitrogenous organisms or ammonia-contained organisms and cause them to be oxidized into inorganic substances for settling to the drain pipe 6. After having been filtrated through the cylindrical brushes 3, clean water is guided through the clean water recycling pipe 4 into the fishpond A again (see FIG. 2). The second water pump 7 produces a relatively higher horsepower, therefore a vacuum will be produced in the drum filter 1 as the second water pump 7 is started. As the second water pump 7 is turned on, water is continuously drawn from the fishpond A into the drum filter 1 at a higher flow rate to flush the cylindrical brushes 3 and carry all debris and impurities into the drain pipe 6 (see FIG. 3).

According to experimentation, if the fishpond A contains 10 metric tons of water, and the capacity of the first water pump 5 is 100 W (about 1/7 horsepower), the water can be well filtrated and circulated through the clean water recycling pipe 4 by continuously operating the first water pump 5 through one day (24 hours). The capacity of the second water pump 7 is preferably set at 10 times over the first water pump 5, namely, the capacity of the second water pump 7 is set at 1000 W (about 1.5 horsepower) if the capacity of the first water pump 5 is 100 W. A timer may be connected to the second water pump 7 to control its operation once a day at a time duration of 8 to 10 seconds. The volumetric ratio between the drum filter 1 and the fishpond A is preferably designed at 1:10. The height (pressure difference) of the drum filter 1 should be not less than one meter so that the drop in elevation ensures a satisfactory straining effect.

What is claimed is:

1. Auto-flushing drainage filter system comprising:
   a drum filter having a top opening connected to a fishpond at the lowest bottom thereof;
   a flow guide fastened to said drum filter by adjusting tie screws and spaced above the top opening of said drum filter;
   cylindrical brushes suspended from said flow guide and vertically arranged within said drum filter around a circle;
   a clean water recycling pipe having one end disposed within said cylindrical brushes and an opposite end extended out of said drum filter and turned to the outside above said fishpond for circulation of water through said fishpond;
   a first water pump connected to said clean water recycling pipe;
   a drain pipe connected to said drum filter for drawing water away from said fishpond; and
   a second water pump connected to said drain pipe, said second water pump producing a higher horsepower than said first water pump;
   whereby turning on said first water pump causes a circulation of water through said fishpond, said drum filter and said clean water recycling pipe for permitting debris and impurities to be removed from the water and settled to said drain pipe; turning on said second water pump causes a sudden rush of water to be induced from said fishpond to said drain pipe through said drum filter and said cylindrical brushes to carry debris and impurities away from said fishpond.

* * * * *